Aug. 8, 1961    F. E. TAYLOR ET AL    2,995,678
SPIRAL SCANNING CIRCUIT
Filed Aug. 26, 1957    4 Sheets-Sheet 1
Fig. 1
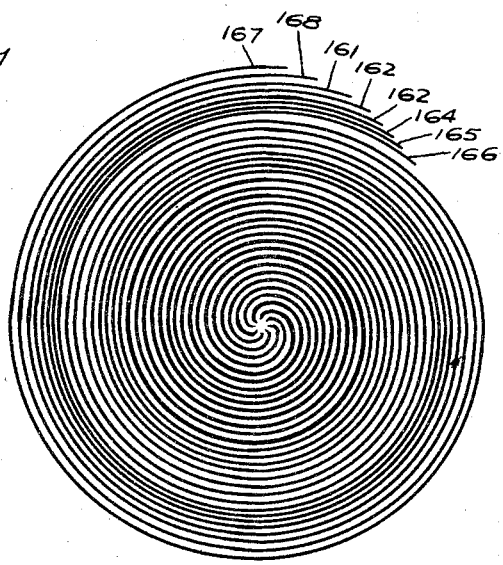
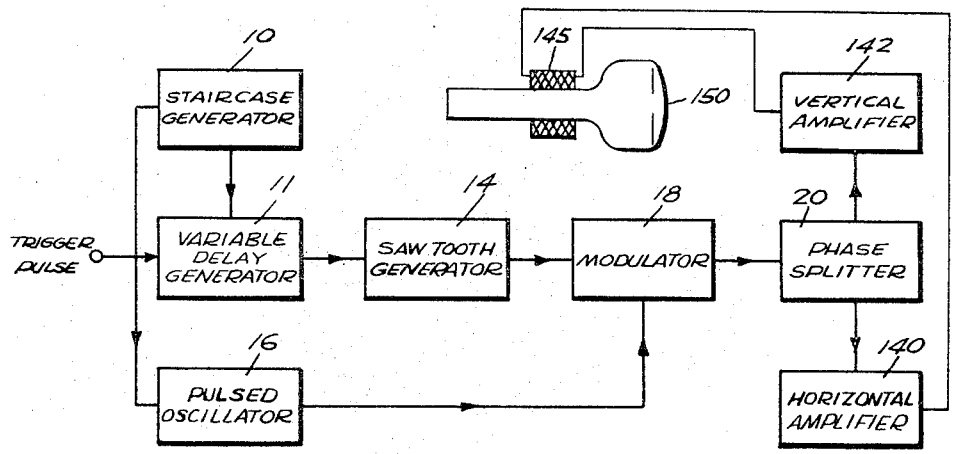
Fig. 2
INVENTOR
FRANK E. TAYLOR
JOHN A. BUCKBEE
By Elmer J. Gorn
ATTORNEY

INVENTORS
FRANK E. TAYLOR
JOHN A. BUCKBEE

Aug. 8, 1961     F. E. TAYLOR ET AL     2,995,678
SPIRAL SCANNING CIRCUIT
Filed Aug. 26, 1957     4 Sheets-Sheet 4

INVENTORS
FRANK E. TAYLOR
JOHN A. BUCKBEE
BY Elmer J. Gorn
ATTORNEY

২,৯৯৫,৬৭৮
Patented Aug. 8, 1961

2,995,678
SPIRAL SCANNING CIRCUIT
Frank E. Taylor, Newton, and John A. Buckbee, Wellesley, Mass., assignors to Raytheon Company, a corporation of Delaware
Filed Aug. 26, 1957, Ser. No. 680,343
9 Claims. (Cl. 315—24)

This invention relates to a spiral scan technique, and, more particularly, to a spiral sweep circuit using several interlaced spirals.

In certain radar applications it is desirable to make use of a storage device as a remote radar indicator.

The video information is written into this storage device during some usable portion of the radar range sweep and is read out of the storage device during the time between the radar range sweep and the next radar trigger pulse. The dead time available for readout must not be too large lest the range of the radar be unduly restricted.

The problem then becomes one of utilizing the available dead time effectively to obtain the required scan resolution which is of the order of five hundred lines.

A spiral scan during the readout time has been found to possess certain advantages. As is well known in the cathode ray tube art, a spiral beam deflection may be produced by applying quadrature signals to the horizontal and vertical deflection means of a cathode ray device, each of said quadrature signals being made up of a sinusoidal voltage modulated by a sawtooth voltage. The invention involves means for producing several interlaced spiral scans. A fixed time interval after the occurrence of each radar trigger pulse, a scan trigger pulse is produced. These scan triggers, which hereafter will be referred to simply as trigger pulses, occur at the end of each radar range sweep, that is, at the start of the afore-mentioned dead time, during which time information is to be read out of the storage device. These trigger pulses are fed into a pulsed oscillator which generates coincident with each trigger pulse a burst of sinusoidal energy usually for the duration of the dead time. In order to clarify the explanation of the circuit, a numerical example will be given; however, the invention is not restricted to the values herein mentioned. It will be assumed, for example, that a pulse repetition rate of 333 pulses per second, corresponding to a time interval between pulses of three thousand microseconds, is desired and that dead time (read out time) is to be one thousand microseconds between radar pulses, and, further, that a resolution of 480 lines is desired. It further will be assumed that a time sharing system is used whereby $n$ different interlaced spirals are to be obtained. The interlacing technique is accomplished by having the trigger pulses activate a time delay generator, or gate, designed to delay the start of the $n$ sawtooth waves generated by a sawtooth generator the required amount of time necessary to advance the sinusoidal components of the spiral by $$\frac{360°}{n}$$

The delay gate, in turn, is controlled by a staircase generator which produces $n$ different voltage steps to open the delay gates for different periods of time. A recurring sequence composed of $n$ sawtooth waves initiated at the proper time as set by the delay gate and corresponding to an equal number of recurring groups of trigger pulses modulate the corresponding sinusoidal bursts of energy produced by the pulse oscillator. The modulated signal next is separated by a phase splitter into two quadrature components, one of which is fed into the horizontal deflection amplifier of the storage device and the other of which is supplied to the vertical deflection amplifier of said storage device. The quadrature components, each including sinusoidal oscillations whose amplitude increases linearly with time for the duration only of the sawtooth, cause the electron beam of the storage device to be deflected along a series of spiral paths. Because of the varying delay in the origination of each spiral, each spiral occupies a different spatial pattern resulting in a series of interlacing spirals which are equally spaced provided the total delay interval, equal to one cycle of the sinusoidal waves, is divided to an equal number of parts, as by the delay gate.

By using a 33.3 kc. spiral, 30 cycles may be generated in the period of 1,000 microseconds during each burst of sinusoidal oscillations occurring in the 3,000 microsecond period between radar trigger pulses, and only eight such periods would be required to generate a raster crossing 480 lines along a diameter of the display tube. It should be noted that if there were eight interlaced spirals, each having thirty convolutions, these 240 rotations would cross all diameters of the display tube type twice, giving the 480-line raster. On the other hand, if a television-type scan were used requiring 60 microseconds to scan one line, a maximum of sixteen lines could be read during each read period and thirty such periods would be required to generate the same 480-line raster as is generated by the system of the invention with but eight such periods.

Another advantage of this spiral scan over a television scan exists because of the form of the target returns received in a typical PPI presentation. With such a presentation, the range resolution of the radar is a function of the pulse length of the radar burst, while the azimuth resolution is a function of radar beam width. In many instances, because of the comparatively broad beam width of antennas, target returns on a PPI presentation are sharp in the range direction and relatively broad in the azimuth direction. A television-type scan would cross targets located in a vertical direction on the stored PPI presentation in the direction of greatest length, while crossing targets located in a horizontal direction across their shortest dimension, that is, range. The band width of amplifiers passing the output signals from the storage tube, consequently, would have to be sufficiently wide to pass the high frequencies obtaining when the scan passes the narrow dimension of the stored trail. A spiral scan, on the other hand, would be traveling always in such a direction as to intercept targets along their long dimensions. The video passband of the output amplifiers thus can be made much lower without sacrificing picture resolution, since band width is not a function of range resolution in the spiral scan but is solely a function of the number of spiral lines across the diameter of the tube.

Still another advantage of the spiral scan results from the fact that the spiral scan is achieved basically by means of a constant frequency sine wave, as contrasted with television scans utilizing sawtooth waves containing high and low frequency components. Therefore the frequency requirements of the deflection means of the storage tube and/or display tube are considerably less stringent when using a spiral-type scan.

Other objects and advantages of this invention will become more evident from examination of the drawing wherein:

FIG. 1 is a typical interlaced spiral scan achieved by means of the invention;

FIG. 2 is a block diagram showing the sweep generator for generating the interlaced spiral scan of FIG. 1;

Figure 3:
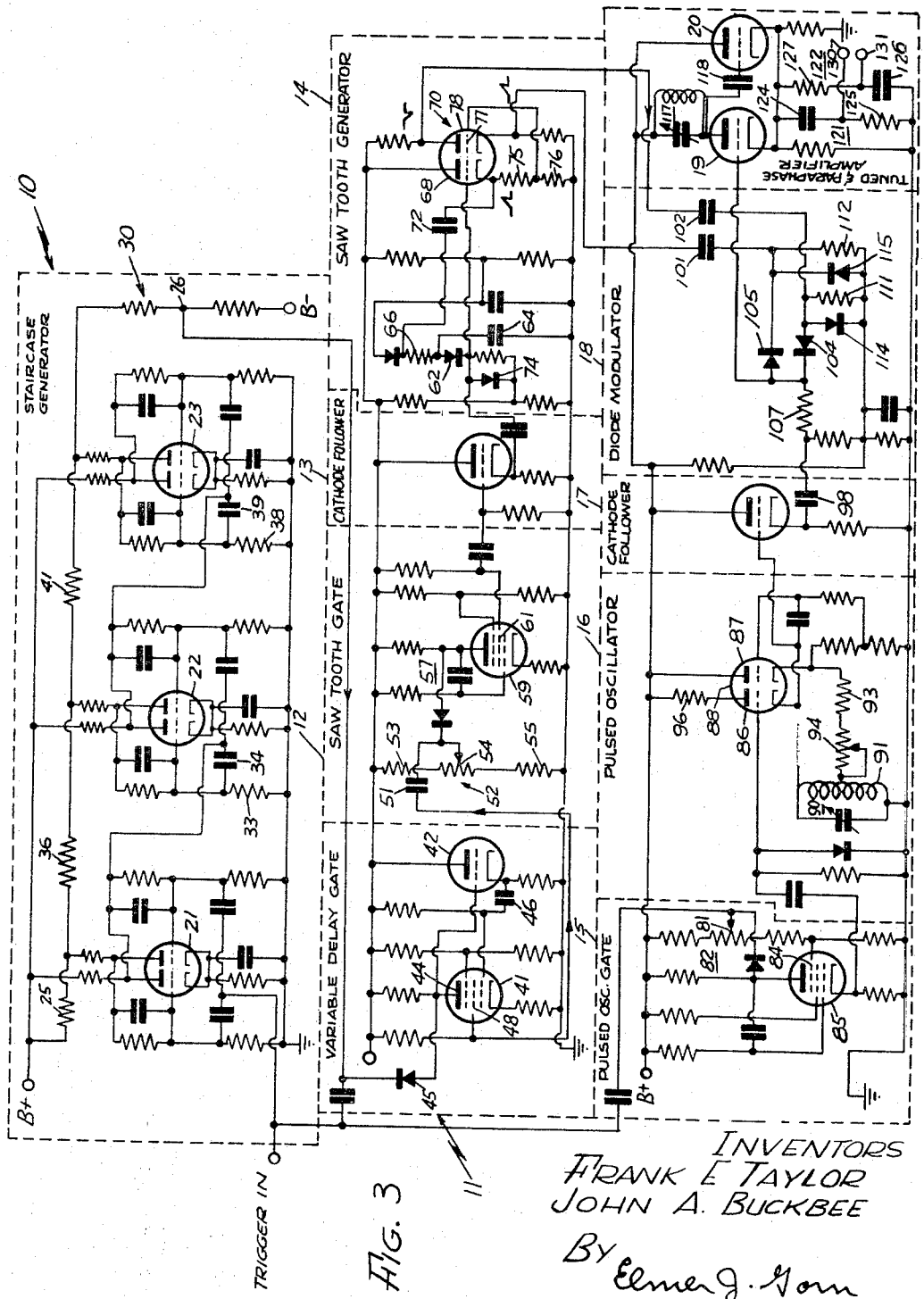
FIG. 3 is a schematic diagram of the sweep generator shown in FIG. 2.
Figure 4:
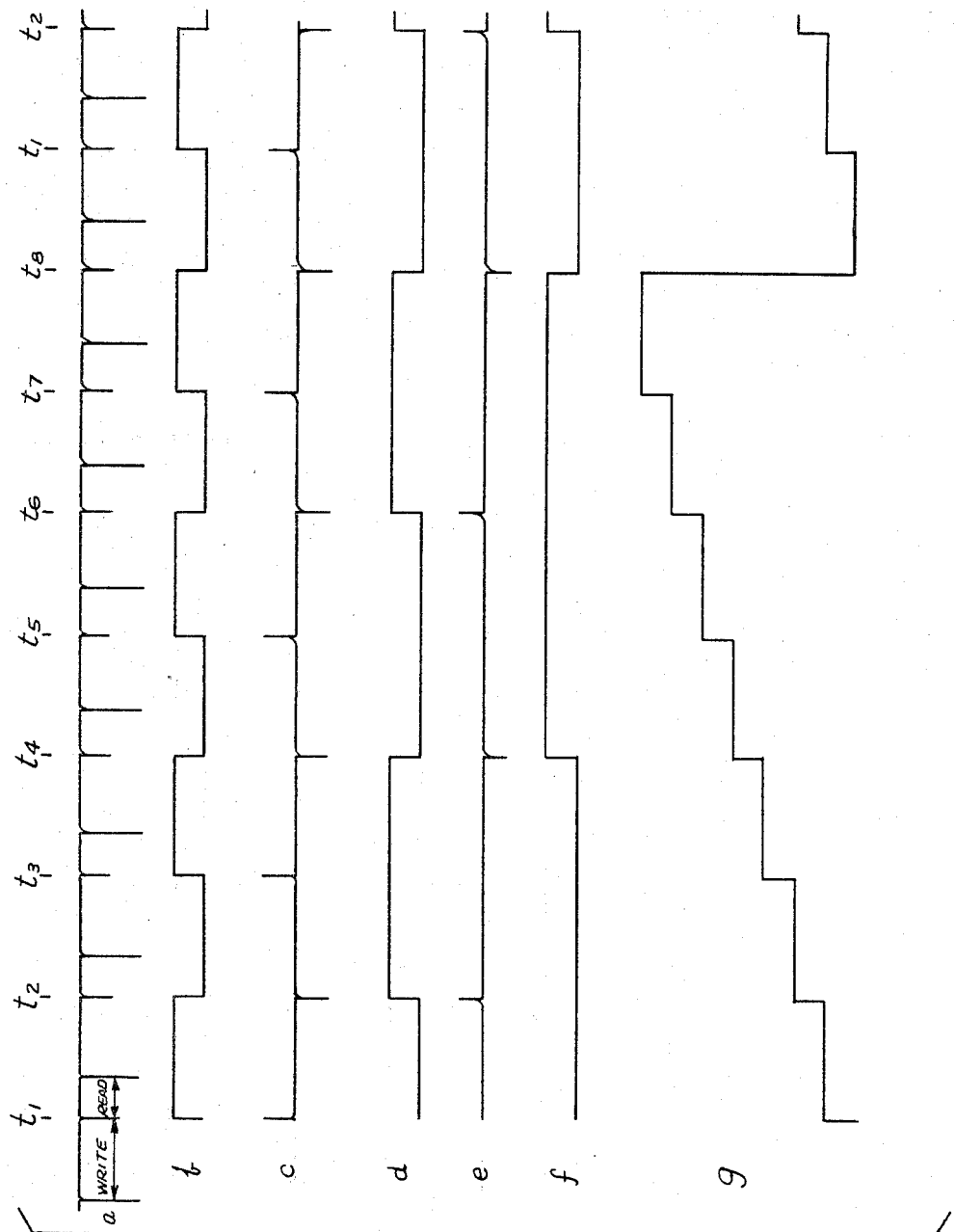
Figure 4:
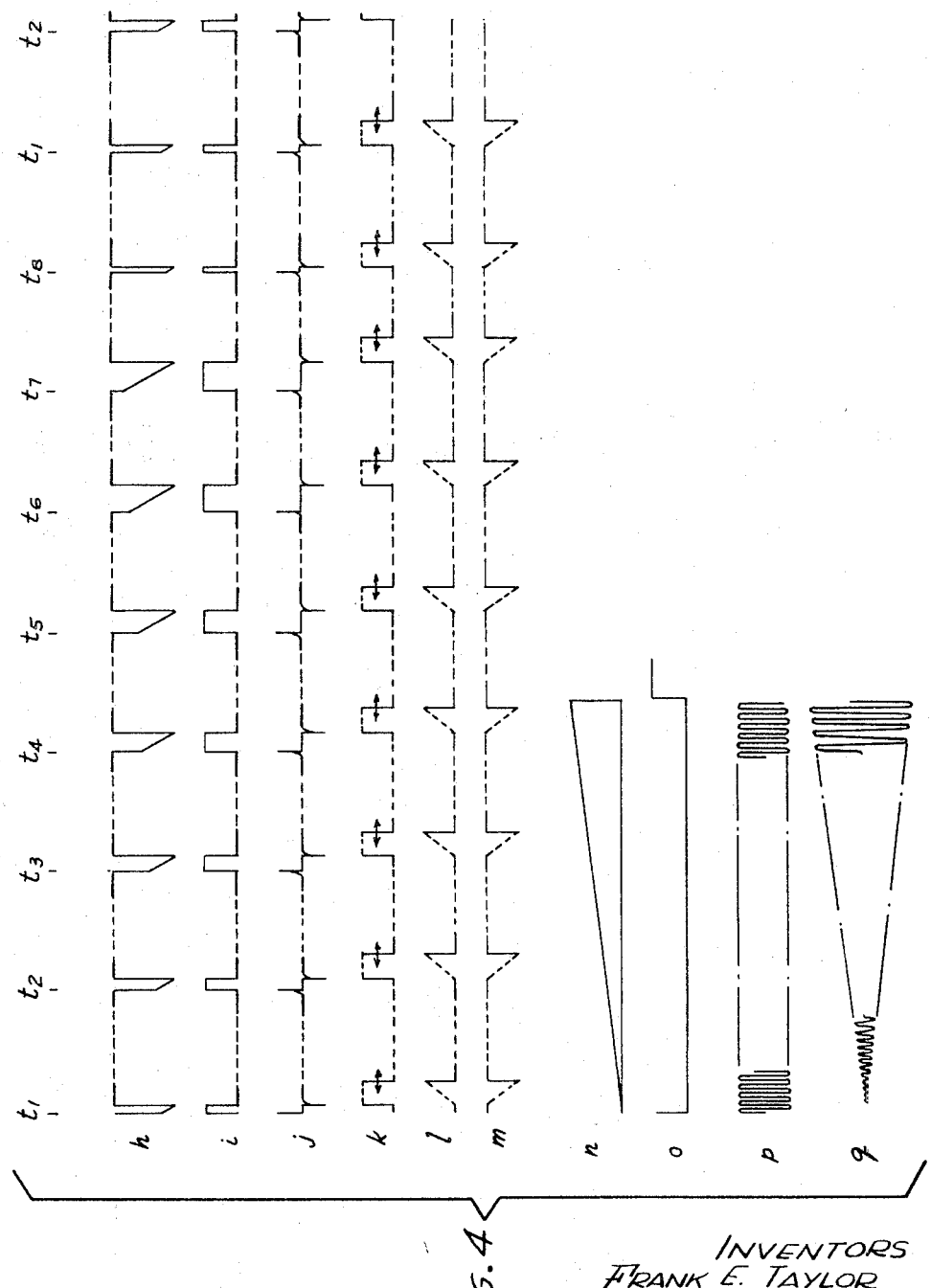

FIG. 4 consists of wave forms explaining the operation of the circuit of FIG. 3.

Referring to FIG. 4a of the drawing, a group of trigger pulses occur at times $t_1 \ldots t_8$ which are equally spaced intervals of time. These triggers, otherwise known as scan triggers, are generated a fixed interval of time after the main radar trigger, indicated in FIG. 4a by the longer pulses. The interval between the arrival of the main radar triggers and the scan triggers is the active period of the radar system, and, during this time, information may be written into a storage tube. The length of the writing period is, of course, dependent upon the maximum range requirement of the radar system. The shorter period between the arrival of the scan trigger pulses—the shorter pulses of FIG. 4a—and the beginning of the next radar pulse is used for reading out information from the storage tube. It is during this time that the interlaced spiral scan is produced in a manner which will be explained now with reference particularly to FIGS. 2 and 3.

The negative trigger input pulses (see wave form of FIG. 4a) is supplied to the input circuit of a bistable multivibrator 21 which, together with multivibrators 22 and 23, comprise a staircase or stepped-wave generator 10. This generator operates on the principles of addition of voltages in a resistance network of the square wave outputs of a plurality of multivibrators. As is well known, each of the bistable multivibrators 21, 22, and 23 is adapted to flop from one state to another with the arrival of a negative input pulse. For purposes of explanation, it will be assumed that the left-hand section of each of the multivibrators is conducting. A negative input trigger pulse coupled to the grid of the right-hand section of multivibrator 21 will cause that section to become cut off and the plate voltage of the left-hand section of multivibrator 21 will increase. The plate voltage is of square wave form, as shown in FIG. 4b, and is of duration equal to the time interval between successive trigger pulses. While the left-hand section of multivibrator 21 is non-conducting, the right hand section is conductive; a current, dependent upon the parameters of the multivibrator, flows through resistor 25 in the plate circuit, whereupon a voltage appears across this resistor of a value which will be designated as $n$ volts. This voltage is superimposed upon the fixed bias existing across voltage divider 30 to produce the first step in the wave form shown in FIG. 4g. During this time interval the right-hand section of multivibrators 22 and 23 are non-conductive. The staircase voltage wave form shown in FIG. 4b represents the drop across resistor 25; it should be remembered that the staircase is superimposed upon the fixed voltage at point 26 of voltage divider 30. The voltage existing at the plate of the left-hand section of multivibrator 21 is coupled to the control grids of multivibrator 22 through a differentiating circuit including a resistor 33 and capacitor 34 in the grid circuit of multivibrator 22 to derive a wave form such as indicated in FIG. 4c. The second multivibrator 22 will flop only in response to the negative-going spikes of the wave form of FIG. 4c. Assuming that the left-hand section of multivibrator 22 is normally conducting, a positive square wave output, indicated in FIG. 4d, will be initiated during each negative spike of the wave form of FIG. 4c, and this square wave output will remain until the arrival of the next trigger pulse. Current will flow through the right-hand section of multivibrator 22 through resistors 25 and 36 which are of substantially equal value. If the current flowing in multivibrator 22 is equal to that in multivibrator 21, the voltage across resistor 36 will be the same during conduction in the right-hand section of multivibrator 22 as the voltage drop across resistor 25 when the right-hand section of multivibrator 21 is conducting.

Upon the arrival of the second trigger pulse, the right-hand section of multivibrator 21 has ceased conducting and the right-hand section of multivibrator 22 becomes conductive; current flows through resistors 25 and 36 in series to produce a voltage drop of $n$ volts across each resistor or a voltage $2n$ which is superimposed upon the fixed bias at point 26 of output resistor 30. This produces the second step in wave form 4g.

Upon the arrival of the third trigger pulse, current again is flowing in the right-hand side of multivibrator 21 and continues flowing in the right-hand side of multivibrator 22. In addition to the current flowing through resistor 25 from multivibrator 21, there is current flowing through this same resistor from multivibrator 22. Current also flows through resistor 36 in the plate circuit of multivibrator 22; the right-hand side of multivibrator 23, however, is not conducting. Consequently, a voltage drop of $3n$ volts is derived across the serially connected resistors 35 and 36. See the third step in the voltage wave form of FIG. 4g.

The positive square wave (FIG. 4d) at the plate of the right-hand section of multivibrator 22 is coupled to the input circuits of multivibrator 23 through a differentiating circuit including resistor 38 and capacitor 39, whereby the wave form shown in 4e is derived. The negative spikes of this input wave form to multivibrator 23 results in a square wave voltage shown in FIG. 4f being derived at the plate of the left-hand section of multivibrator 23. It will be noted that multivibrator 23 is not triggered in such a manner that current flows in the right-hand section thereof until the arrival of the fourth trigger pulse.

Upon the arrival of the fourth trigger pulse, conduction of the right-hand section of multivibrator 23 occurs, whereupon current flows through a resistor 41 whose value is twice that of resistors 25 and 36. The voltage drop across resistor 41 during conduction of the right-hand section of multivibrator 23 consequently is twice that existing across resistors 25 and 36 during passage of current therethrough or $2n$ volts. It will be noted that upon the arrival of the fourth trigger pulse, the right-hand section of multivibrator 23 only is conducting and current flowing through the series path including resistors 41, 36, and 25 produce a voltage of $4n$ volts. This voltage step is the fourth step in FIG. 4g.

As the fifth trigger pulse arrives, the right-hand section of multivibrator 21 again conducts while the right-hand section of multivibrator 23 continues to conduct. The current of both multivibrators 21 and 23 flows through resistor 25, while the current of multivibrator 23 flows through resistors 25, 36, and 41. The resultant voltage is thus $5n$ volts, as indicated by the fifth step in the wave form of FIG. 4g.

When the sixth trigger pulse arrives, the right-hand section of multivibrator 22 conducts while the right-hand section of multivibrator 23 remains conductive; the right-hand section of multivibrator 21, however, is nonconductive. Current from both multivibrators 22 and 23 thus flows through both resistors 25 and 36, while current from multivibrator 23 flows through each of resistors 25, 36, and 41. Thus, the resultant current is equal to $6n$ volts, as indicated in the sixth step of the wave form of FIG. 4g.

Upon the occurrence of the seventh trigger pulse, the right-hand section of multivibrator 21 resumes conduction, while the right-hand sections of multivibrators 22 and 23 remain conductive. Now current flows through all three multivibrators through resistor 25, from multivibrators 22 and 23 through resistor 36 and from multivibrator 23 through resistor 41. Thus, the net voltage step superimposed upon the fixed bias at point 26 of voltage divider 30 is $7n$ volts.

Finally, as the eighth trigger pulse arrives, the right-hand sections of all multivibrators are nonconductive and the sum of the voltages across series-connected resistors 25, 36, and 41 is zero. The output at point 26 of the voltage divider 30 now is simply the fixed bias across the voltage divider 30. The cycle above described repeats itself so long as trigger pulses are available at the input terminal to the staircase generator 10. It is possible, of course, to obtain a staircase wave form by triggering the right-hand sections of the multivibrators into nonconduction rather than the left-hand sections. The same sequence of steps will be obtained except that the first step in the wave form of FIG. 4g will start at zero rather than at $n$ volts.

The resultant staircase wave form of FIG. 4g is applied to variable delay generator or gate 11, together with the trigger pulses already mentioned. The variable delay gate 12 is shown by way of example as a phantastron including a pentode stage 41 and a cathode follower stage 42. The trigger pulses of FIG. 4a and the staircase voltage of FIG. 4g are applied to the plate 44 of pentode 41 through diode 45. The phantastron produces a variable time delay which is a linear function of the control voltage—in this case the staircase voltage of generator 10. The phantastron shown in FIG. 3 is similar to that illustrated on page 57-2 and described on pages 57-3 to 57-6 of the "Handbook 'Preferred Circuits,' Navy Aeronautical Electronic Equipment, NAVAER 16-1-519," prepared by the National Bureau of Standards, Department of Commerce, for Bureau of Aeronautics, Department of the Navy, published September 1, 1955. By coupling the capacitor 46 of the phantastron between the plate and control grid of phantastron tube 41 through the cathode follower 42, the recovery time of the phantastron circuit is materially decreased. The use of a cathode follower to provide a low resistance recharging path for the phantastron capacitor is also shown in FIG. 5.48 of "Wave Forms" by Chance et al., page 199, first edition, published in 1949 by McGraw-Hill Book Company, Inc. This is volume 19 of the M.I.T. Radiation Laboratory Series. The duration of the phantastron output wave form is proportional to the magnitude of the staircase wave form (FIG. 4g) applied to the plate circuit of phantastron tube 41. The voltage produced at the plate of tube 41 is indicated in FIG. 4h. It should be noted that the time scale for the wave form of FIG. 4h, as well as for those of FIG. 4i to FIG. 4q, is considerably exaggerated as compared with that for the trigger pulse of FIG. 4a in order to indicate the wave shape of FIG. 4h et seq. more clearly. The minimum duration of the wave form of FIG. 4h, for example, is of the order of 50 microseconds, while the interval between trigger pulses may be of the order of one millisecond, depending, of course, upon the requirements of the equipment in which the system of the invention is used. For example, if a radar having a pulse repetition rate of a thousand microseconds is involved, the interval between trigger pulses would be one millisecond. The remaining portion of the cycle in the wave form of FIG. 4h is indicated by dotted lines. The voltage level at which the sloping portion of each pulse of wave form 4h commences is partially determined by the diode 45. The screen voltage at the screen grid 48 of phantastron tube 41 is indicated in FIG. 4i and is substantially a square wave of gradually decreasing duration corresponding in width to the width of the respective pulses at the phantastron plate (FIG. 4h). The voltage at the screen grid 48 is differentiated by means of capacitor 51 and the voltage divider network 52 including resistor 53, potentiometer 54 and resistor 55, whereby the wave form shown in FIG. 4j is obtained. This wave form includes negative spikes which are delayed with respect to the corresponding trigger pulse by varying amounts for each step of the staircase. Because of design considerations, it is impossible to achieve zero delay with the phantastron 41 in delay generator 12, so that a minimum delay (about 50 microseconds) must be accepted.

The spiked wave form of FIG. 4j next is applied to the plate of a sawtooth gate 12 which may comprise another phantastron circuit 57 including pentode 59 and similar to that used in the variable delay generator 12 except that the cathode follower may be eliminated owing to less stringent requirements of linearity and recovery time. The phantastron of the sawtooth gate 14 is triggered by the negative spikes of wave form 4k. The square wave output voltage of FIG. 4k, derived at the screen grid 61, has its duration controlled by the setting of potentiometer 54 in the voltage divider network 52. The width of the square output pulse of FIG. 4k should be at least equal to, and preferably slightly wider than, the desired length of the sawtooth, about to be described, derived from the sawtooth generator plus the minimum delay period of about 50 microseconds attainable with the delay phantastron 41. The trailing edge of the wave form of FIG. 4k is indicated in FIG. 4 as variable.

A positive square wave 4h from sawtooth gate 12 is supplied to the grid of a cathode follower 13; a square wave similar in polarity and configuration to the output wave form 4k from the screen of sawtooth gate 12 is derived at the cathode follower 13 and fed to sawtooth generator 14, shown by way of example as a bootstrap circuit.

The square wave from cathode follower 13 cuts off the normally conducting diode 62 and permits condenser 64 to charge through the plate resistor 66 of diode 62; the voltage at the plate of diode 62 thereby increases. In order to obtain the desired linearity, the feedback or bootstrap action of cathode follower 68 is utilized. The cathode follower includes the left-hand section of dual triode 70. The output of cathode follower 68 is coupled back to the plate circuit of diode 62 through capacitor 72. When capacitor 64 begins to charge, the rise in potential at the plate of the diode 62 is fed to the cathode follower grid. The increased plate current of cathode follower 68 causes its cathode potential to rise by about the same amount. The cathode of the cathode follower thus feeds back through capacitor 72 the same increase in potential that the plate of diode 62 originally lost. Thus the voltage across resistor 66 remains essentially constant and the charging current through resistor 68 remains nearly constant throughout the sweep interval. The sweep voltage wave form appears at the cathode of cathode follower 68 as a positive-going sawtooth which is approximately linear. See the wave form of FIG. 4l. The diode 74 maintains the voltage at the junction of resistor 66 and capacitor 64 at a substantially fixed level between sweeps.

An output pulse may be taken from the junction of cathode resistors 75 and 76 of cathode follower 68 and is similar in wave form to that at the grid of the tube. See the wave form of FIG. 4l. This sawtooth output is supplied to the grid 77 of a paraphase amplifier tube 73 comprising the right-hand section of dual triode 70 and serves to produce two sawtooth output wave forms from the plate circuit and the cathode circuit, respectively, which are of opposite polarity, as indicated by the wave forms of FIG. 4l and 4m. An expanded view of the sawtooth wave form of FIG. 4l corresponding to the seventh trigger pulse is indicated in FIG. 4n.

The input trigger pulses, previously referred to, also are supplied to the plate of a pulsed oscillator gate 15, which is shown here as a phantastron whose basic construction and operation is similar to that of sawtooth gate 12. The pulsed oscillator gate includes a control potentiometer 81 forming part of screen voltage divider network 82 for varying the direct current control voltage on the screen grid 84 of phantastron tube 85 and, hence, the duration of the square wave form derived from the tube cathode. This wave form is shown in FIG. 4o wherein the scale has been expanded, as in the case of FIG. 4n.

A square wave generated by pulsed oscillator gate circuit 15 is coupled to the input circuit of a pulsed oscillator 16 which may be a pulsed Hartley oscillator of the type shown in FIG. 4.46 on page 143 of "Wave Forms" by Chance et al., volume 19 of the M.I.T. Radiation Laboratory Series, 1949 edition, published by McGraw-Hill Book Company, Inc. Sinusoidal oscillations, indicated by the wave form of FIG. 4p, are initiated by the leading edges of the negative square wave gate 40 applied to the grid of the left-hand section 86 of oscillator tube 88. The voltage across the tuned circuit 90 is applied to the grid of the right-hand section 87 of tube 88, which section serves as a cathode follower. The cathode of the cathode follower section is returned through resistor 93 and potentiometer 94 to the center tap of coil 91 of tuned circuit 90. By means of the cathode follower, damping of the sinusoidal oscillations owing to energy dissipation in the plate resistor 96 of oscillator section 86 is compensated for. The potentiometer 94 may be adjusted to obtain oscillations of constant amplitude. The tuned circuit 90 may be tuned to a frequency dependent upon the number of turns of the spiral scan desired. In the example earlier mentioned, this frequency would be 33,333 kilocycles per second.

At the end of the negative square wave gating pulse of FIG. 4o section 86 of tube 88 once more becomes conductive and the oscillations are rapidly damped out by reason of the low cathode resistance of tube section 86. A sinusoidal wave form from pulsed oscillator 16 is shown in FIG. 4p.

It should be noted that the bursts of sinusoidal oscillations each start coincident with the corresponding trigger pulse, in contrast with the sawtooth waves, which, as indicated in FIGS. 4l and 4m, start at varying intervals after the arrival of the corresponding trigger pulse. The output of pulsed oscillator 16 is supplied to a cathode follower stage 17; an output similar to the output pulse from pulsed oscillator 16 is taken from the cathode of cathode follower 17.

The sinusoidal wave form from cathode follower 17 is supplied to a diode modulator 18 along with the two sawtooth wave forms 4l and 4m from the sawtooth generator 14. The sinusoidal oscillations produced by the pulsed oscillator 16 are coupled to the modulator 14 through condenser 98, while the sawtooth wave forms are supplied to modulator 18 by way of condensers 101 and 102, respectively. Sinusoidal bursts of energy from pulsed oscillator 16 are applied to the cathode of diode 104 of modulator 18 and to the plate of diode 105. These diodes normally are conducting and thus present a relatively low impedance in the path including resistors 111 and 112. Most of the voltage drop then appears across resistor 107, which is of relatively high resistance, and there is no appreciable output available at the junction of resistor 107 and the diodes. Each diode is cut off by different halves of the sine wave from pulsed oscillator 16. Diodes 114 and 115 are clamping diodes for maintaining the proper reference potential for diodes 104 and 105, respectively. As each of the sawtooth voltages from sawtooth generator 14 increases in amplitude, the current flowing in the respective diodes decreases and a greater proportion of the voltage drop exists at the junction of resistor 107 and diodes 104 and 105, as the case may be. In this way the sinusoidal oscillations from pulsed oscillator 16 are amplitude-modulated by the sawtooth waves. It should be noted that there is no output from modulator 18 in the absence of sawtooth waves.

The resultant wave form from diode modulator 18 is clipped somewhat by the action of diodes 104 and 105. This wave form from modulator 18, therefore, is applied to the grid of a tuned amplifier 19 which includes a tuned circuit 117 in the plate circuit thereof tuned to the same frequency as pulsed oscillator 16. The harmonics of the signal from modulator 18 are filtered out by the tuned amplifier so that a linear growing sinusoidal signal indicated in FIG. 4q is obtained. This signal from the plate of tuned amplifier 19 is applied by way of condenser 118 to a phase splitter 20, including a triode having two RC phase-shifting networks 121 and 122 connected in the cathode circuit thereof. The first of these phase-shifting networks 121 comprises a condenser 124 and resistor 125 and provides an output wave form at terminal 130 which is forty-five degrees ahead of the phase of the modulated signal from tuned amplifier 19. The second of these phase-shifting networks 122 consists of condenser 126 and resistor 127 which shifts the phase of the signal from tuned amplifier 19 forty-five degrees in the opposite direction so that the phase of the signal at terminal 131 is forty-five degrees behind that of the modulated signal from tuned amplifier 19. The modulated signals at terminals 130 and 131, consequently, are 90 degrees out-of-phase and are connected to the horizontal and vertical deflection amplifiers 140 and 142, shown in FIG. 2, which supply the deflection coils 145 of a cathode ray tube or storage tube 150. The resultant scan on the cathode ray tube or storage tube derived from these two quadrature signals is a spiral, as indicated in FIG. 1. After each trigger pulse, a number of sinusoidal waves is produced by the pulsed oscillator 16 which determine the number of turns in a given spiral. The duration of the spiral is determined by the width of the sawtooth waves from sawtooth generator 14.

As already stated, the amount of delay of the sawtooth waves 4l and 4m after the arrival of the corresponding trigger pulse depends upon the magnitude of the control voltage (wave form 4g). For proper spiral interlace, the voltage increments between successive steps should be equal, so that the delay period should vary by equal amounts from the minimum in the case of the eighth step of the wave form of FIG. 4g, to a maximum in the case of the seventh step of the wave form of FIG. 4g. As previously mentioned, there is an unavoidable minimum delay period in the variable delay generator 11 which is of the order of 50 microseconds. The maximum delay period is equal to the period of one sinusoid of the output of pulsed oscillator 16 plus this minimum delay period realizable from the variable delay generator. If "N" spirals equally spaced are to be obtained, it is necessary to divide the time interval between minimum and maximum delay time into N equal parts. For example, assuming a sinusoidal oscillator running at 33,333 cycles per second, viz., having a period of 30 microseconds, if eight interlaced spirals are required, the first sawtooth should be delayed by a period equal to ⅛ of 30 microseconds, or 3.75 microseconds plus the fixed minimum delay; the second sawtooth should be delayed ⅔ of 30 microseconds, or 7.5 microseconds plus the fixed delay, etc. In other words, for the example given, the delay period of the sawtooth after initiation of the sinusoidal wave form, i.e., after the corresponding trigger pulse, will be as follows:

Table I

| Trigger | Amount of delay of sawtooth after initiation of Sinusoidal wave form, microseconds |
| --- | --- |
| 1 | 53.75 |
| 2 | 57.5 |
| 3 | 61.25 |
| 4 | 65.0 |
| 5 | 68.75 |
| 6 | 72.5 |
| 7 | 76.25 |
| 8 | 50.0 |

It should be understood, of course, that the amount of delay will depend upon the frequency of the sinusoidal oscillator 16 and also upon the number of spirals interlaced. If sixteen spirals are to be interlaced, it would be necessary to divide the total delay period into sixteen equal parts.

The spirals generated by the various wave forms typified by FIG. 4q are shown in FIG. 1. The various spirals occurring during a given sequence of eight trigger pulses is indicated by the reference numerals 161 to 168.

This invention is not limited to the particular details of construction, materials and processes described, as many equivalents will suggest themselves to those skilled in the art. It is accordingly desired that the appended claims be given a broad interpretation commensurate with the scope of the invention within the art.

What is claimed is:

1. A system for energizing the beam deflection apparatus of a cathode ray tube comprising means generating a recurring series of bursts of sinusoidal signal, means producing a recurring series of sawtooth signals corresponding to said bursts, each sawtooth wave being delayed a different amount relative to the corresponding burst, means coupled thereto for combining said bursts of sinusoidal signal and said delayed sawtooth signals, and means coupled to said combining means for applying quadrature components of said combined signals to said beam deflection apparatus.

2. A system for energizing the beam deflection apparatus of a cathode ray tube comprising means generating a recurring series of bursts of sinusoidal energy, means for producing a series of sawtooth waves corresponding to said bursts, each sawtooth wave being delayed a different amount relative to the corresponding burst, modulating means responsive to said bursts of sinusoidal energy and said delayed sawtooth waves whereby said bursts are modulated by said delayed sawtooth waves, and means coupled to the output of said modulating means for applying quadrature components of said modulated bursts of sinusoidal energy to said beam deflection apparatus.

3. A system for energizing the beam deflection apparatus of a cathode ray tube comprising means generating a recurring series of bursts of sinusoidal energy, means producing a recurring series of sawtooth waves corresponding to said bursts, each sawtooth wave being delayed a different amount relative to the corresponding burst, modulating means responsive to said bursts of sinusoidal energy and said delayed sawtooth wave for amplitude modulating that portion of each sinusoidal burst which is coincident with a corresponding sawtooth wave, and means coupled to the output of said modulating means for applying quadrature components of said modulated bursts of sinusoidal energy to said beam deflection apparatus whereby said beam sweeps an interlaced spiral scan on the face of said cathode ray tube.

4. In combination with an indicating device including beam deflection means, means for generating a recurring series of $n$ bursts of sinusoidal energy which are initiated at equally spaced intervals, $n$ being any integer greater than one, means for producing a recurring series of $n$ sawtooth waves corresponding to said series of sinusoidal bursts, each of said sawtooth waves being delayed different amounts after the corresponding bursts of sinusoidal energy, means for amplitude-modulating that portion of said sinusoidal burst of energy coincident with the sawtooth wave with said sawtooth wave to produce a repetitive group of $n$ composite signals each commencing at the same time as said corresponding sawtooth wave, and means for applying quadrature components of each of said composite signals to said beam deflection means of said device to generate interlaced spiral scans in said device.

5. In combination, a cathode-ray-type indicating device including means for scanning said device in accordance with deflection signals supplied thereto, means for generating a recurring series of a predetermined number of spaced trigger pulses, means for initiating a sinusoidal voltage in response to each of said trigger pulses, means for producing a sequence of sawtooth waves for each series of trigger pulses, means for delaying each of the sawtooth waves of said sequence by different amounts with respect to a corresponding trigger pulse, and means for combining said sinusoidal voltages and said sawtooth waves to produce a recurring series of deflection signals for scanning said indicating device with said predetermined number of interlaced spirals.

6. In combination, a cathode-ray-type indicating device including means for scanning said device in accordance with deflection signals supplied thereto, means for generating a recurring series of a predetermined number of equally spaced trigger pulses, means for initiating a sinusoidal voltage in response to each of said trigger pulses, means for producing a sequence of sawtooth waves for each series of trigger pulses, means for delaying each of the sawtooth waves of said sequence by different amounts with respect to a corresponding trigger pulse, the delay increment for successively occurring sawtooth waves being fixed, and means for combining said sinusoidal voltages and said sawtooth waves to produce a recurring series of deflection signals for scanning said indicating device with said predetermined number of interlaced spirals.

7. In combination, a cathode-ray-type indicating device including means for scanning said device in accordance with deflection signals supplied thereto, means for generating a recurring series of a predetermined number of spaced trigger pulses, means for initiating a sinusoidal voltage in response to each of said trigger pulses, means for producing a sequence of sawtooth waves for each series of trigger pulses, means for delaying each of the sawtooth waves of said sequence by different amounts with respect to a corresponding trigger pulse, means for modulating said sinusoidal voltages with said sawtooth waves to produce a recurring series of signals starting at the same time as the corresponding sawtooth wave, and means for separating each of said signals into two component deflection signals of like frequency and in phase quadrature.

8. In an electron beam-scanning system for scanning the beam of an indicating device having two beam-deflection systems each producing beam deflection in directions perpedicular to that of the other, comprising means for producing a recurring series of $n$ equally spaced trigger pulses, where $n$ is any integer, means for initiating a recurring sequence of bursts of sinusoidal energy immediately upon receipt of a corresponding one of said trigger pulses, a sawtooth generator for producing a recurring sequence of $n$ sawtooth waves, means for delaying the initiating of each of said sawtooth waves by different periods of time following each of the trigger pulses of said sequence, means for combining each of said sinusoidal energy bursts with a corresponding one of said sawtooth waves to produce a sequence of composite signals originating at equally spaced intervals dependent upon the aforesaid delay, means for separating each of said composite signals into two components of like frequency and in phase quadrature, means for energizing one of said deflection systems with one of said components, and means for energizing the other of said deflection systems with the other of said components.

9. A radar system productive of a series of scan trigger pulses each occurring at a fixed interval dependent upon the maximum range of the system after the generation of corresponding main trigger pulses, an electron beam-scanning system for scanning the beam of an indicating device having two beam-deflection systems each producing beam deflection in directions perpendicular to that of the other, comprising means for producing a recurring series of $n$ spaced trigger pulses, where $n$ is any integer, means for initiating during the period between a given scan trigger pulse and the succeeding main trigger pulse a recurring sequence of bursts of sinusoidal energy immediately upon receipt of a corresponding one of said trigger pulses, a sawtooth generator for producing a recurring sequence of $n$ sawtooth waves, means for delaying the initiating of each of said sawtooth waves by different periods of time following each of the trigger pulses of said sequence, means for combining each of said sinusoidal energy bursts with a corresponding one of said sawtooth waves to produce a sequence of composite signals originating at equally spaced intervals dependent upon the aforesaid delay, and means for applying quadrature components of said composite signals to said deflection systems.

References Cited in the file of this patent
UNITED STATES PATENTS

| | | |
|---|---|---|
| 2,552,437 | Korman | May 8, 1951 |
| 2,677,785 | Owen | May 4, 1954 |
| 2,717,329 | Jones | Sept. 5, 1955 |
| 2,885,596 | Kaufmann | May 5, 1959 |